United States Patent
Flanagin et al.

(10) Patent No.: US 6,272,545 B1
(45) Date of Patent: Aug. 7, 2001

(54) SYSTEM AND METHOD FOR INTERACTION BETWEEN ONE OR MORE DESKTOP COMPUTERS AND ONE OR MORE MOBILE DEVICES

(75) Inventors: Steve Flanagin; George Hu, both of Redmond; Haresh G. Ved; Charles Wu, both of Bellevue, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/177,168

(22) Filed: Oct. 22, 1998

Related U.S. Application Data

(63) Continuation-in-part of application No. 09/058,685, filed on Apr. 10, 1998, now Pat. No. 6,128,661, and a continuation-in-part of application No. 09/058,528, filed on Apr. 10, 1998, now abandoned
(60) Provisional application No. 60/063,164, filed on Oct. 24, 1997, and provisional application No. 60/064,986, filed on Nov. 7, 1997.

(51) Int. Cl.[7] ..................................................... G06F 15/16
(52) U.S. Cl. ........................ 709/228; 709/227; 709/248; 709/201
(58) Field of Search .................................... 709/227, 248, 709/201, 228

(56) References Cited

U.S. PATENT DOCUMENTS

| | | |
|---|---|---|
| 5,247,683 | 9/1993 | Holmes et al. . |
| 5,337,044 | 8/1994 | Folger et al. . |
| 5,392,390 | 2/1995 | Crozier ................................. 395/161 |
| 5,414,844 | 5/1995 | Wang ................................... 395/650 |
| 5,497,464 | 3/1996 | Yeh . |
| 5,522,089 | 5/1996 | Kikinis et al. . |
| 5,542,046 | 7/1996 | Carlson et al. ....................... 395/186 |
| 5,555,416 | 9/1996 | Owens et al. . |
| 5,564,070 | 10/1996 | Want et al. . |
| 5,598,536 | 1/1997 | Slaughter, III et al. . |
| 5,625,829 | 4/1997 | Gephardt et al. . |
| 5,664,228 | 9/1997 | Mital . |
| 5,666,530 | 9/1997 | Clark et al. . |
| 5,666,553 | 9/1997 | Crozier ................................. 395/803 |
| 5,684,990 | 11/1997 | Boothby ............................... 395/619 |
| 5,717,737 | 2/1998 | Doviak et al. . |
| 5,721,824 | 2/1998 | Taylor . |
| 5,721,835 | 2/1998 | Niwa et al. ........................... 395/281 |
| 5,727,159 | 3/1998 | Kikinis . |
| 5,727,202 | 3/1998 | Kucala . |
| 5,742,829 | 4/1998 | Davis et al. . |

(List continued on next page.)

FOREIGN PATENT DOCUMENTS

| | | |
|---|---|---|
| WO 94 15294 | 7/1994 | (WO) . |
| WO 94/15294 | 7/1994 | (WO) . |
| WO 96 20445 | 7/1996 | (WO) . |
| WO 97 23853 | 7/1997 | (WO) . |
| WO 97 25665 | 7/1997 | (WO) . |

\* cited by examiner

Primary Examiner—Krisna Lim
(74) Attorney, Agent, or Firm—Westman, Champlin & Kelly, P.A.; S. Koehler

(57) ABSTRACT

A system and method of interaction between a computer, such as a desktop computer, and a plurality of mobile devices include storing a first identifier on a first mobile device and the computer, and storing a second identifier on a second mobile device and the computer, wherein the second identifier is different than the first identifier. A set of settings are stored in the computer referenced to each stored identifier for each respective mobile device. Upon connection of one of the mobile devices to the computer, the identifier stored in the connected mobile device is compared with the identifier stored on the computer. Interaction between the connected mobile device and the computer is controlled as a function of the stored respective set of settings if corresponding identifiers are found.

33 Claims, 7 Drawing Sheets

U.S. PATENT DOCUMENTS

| | | |
|---|---|---|
| 5,790,800 | 8/1998 | Gauvin et al. . |
| 5,812,819 | 9/1998 | Rodwin et al. ............... 395/500 |
| 5,845,090 | 12/1998 | Collins, III et al. . |
| 5,860,012 | 1/1999 | Luu . |
| 5,864,708 | 1/1999 | Croft et al. . |
| 5,887,063 | 3/1999 | Vardharajan et al. ............ 380/21 |
| 5,896,369 | 4/1999 | Warsta et al. . |
| 5,918,016 | 6/1999 | Brewer et al. . |
| 5,958,006 | 9/1999 | Eggleston et al. . |
| 5,974,238 | 10/1999 | Chase, Jr. . |
| 5,983,176 | 11/1999 | Hoffert et al. . |
| 6,000,000 | * 12/1999 | Hawkins et al. ............... 707/201 |
| 6,006,274 | * 12/1999 | Hawkins et al. ............... 709/248 |
| 6,128,661 | * 10/2000 | Flanagin et al. ............... 709/227 |

SYSTEM AND METHOD FOR INTERACTION BETWEEN ONE OR MORE DESKTOP COMPUTERS AND ONE OR MORE MOBILE DEVICES

REFERENCE TO CO-PENDING PATENT APPLICATIONS

The present application claims priority from and fully incorporates herein, U.S. Provisional patent application Ser. No. 60/063,164, filed on Oct. 24, 1997, and U.S. Provisional patent application Ser. No. 60/064,986, filed on Nov. 7, 1997.

This application is also a continuation in part of U.S. patent applications, Ser. No. 09/058,685, filed on Apr. 10, 1998, now U.S. Pat. No. 6,128,661 entitled "INTEGRATED COMMUNICATIONS ARCHITECTURE ON A MOBILE DEVICE" and Ser. No. 09/058,528 filed on Apr. 10, 1998 now abandoned, entitled "SYSTEM AND METHOD FOR INTERACTION BETWEEN DESKTOP COMPUTER AND MULTIPLE MOBILE DEVICES", which have been assigned to the same assignee as the present application and are hereby fully incorporated by reference.

BACKGROUND OF THE INVENTION

The present invention relates to personal mobile computing devices commonly known as handheld portable computers. More particularly, the present invention relates to a system and a method for allowing interaction between a desktop computer and multiple mobile devices.

Mobile devices are small electronic computing devices often referred to as personal desktop assistants. One such mobile device is the Handheld PC (or "H/PC") based on and including the Windows CE brand operating system sold by Microsoft Corporation of Redmond, Wash. Although small, a wide variety of computing tasks and applications can be performed by such mobile devices, such as word processing, spread sheet programs, personal money managers and games, to name a few. In many respects, these programs are very similar to programs that reside on an individual's desktop computer. In some applications, the mobile device may not have as many functions as available on a desktop computer but, nevertheless, are quite valuable as a means for updating and changing data in the field where even a laptop computer may not be available or used conveniently.

It is also common for a mobile device to be used in conjunction with a desktop computer. For example, the user of a mobile device may also have access to, and use, a desktop computer at work or at home. The user may typically run the same types of applications on both the desktop computer and on the mobile device. Thus, it is quite advantageous for the mobile device to be designed to be coupled to the desktop computer to exchange information with, and share information with, the mobile device. In many applications, the user must decide which desktop computer the mobile device will be coupled to or be configured to work with. Having assigned or configured the desktop computer to work with the selected mobile device, the desktop computer cannot be conveniently used with another mobile device. This limitation is particularly disadvantageous when, for example, it is desired that many users interact with a common database stored on the desktop computer. For instance, a sales force may individually return to a home office and interact with a designated desktop computer having a common database that is shared by all in the sales force. Each individual sales person could update each of their respective mobile devices so as to have the most current information in the database, or to update the common database with information obtained in the field. Prior art systems are not convenient to use since each user must reconfigure communication and data transfer parameters each time the user connects the mobile device to the desktop computer. In many situations, each of the users must be using the same type of mobile device.

There is a continuing need to improve the interaction between one or more desktop computers and one or more mobile devices. In particular, there is a need to allow a plurality of mobile devices to interact with the desktop computer without requiring an inordinate amount of configuration by the user as well as allow the user to choose to use a particular mobile device independent of other users interacting with the desktop computer.

SUMMARY OF THE INVENTION

The present invention fulfills these needs by providing a system and a method of interaction between a computer, such as a desktop computer, and a plurality of mobile devices including storing a first identifier on a first mobile device and the computer, and storing a second identifier on a second mobile and the computer, wherein the second identifier is different than the first identifier. A set of settings are stored in the computer referenced to each stored identifier for each respective mobile device. Upon connection of one of the mobile devices to the computer, the identifier stored in the connected mobile device is compared with the identifier stored on the computer. Interaction between the connected mobile device and the computer is controlled as a function of the stored respective set of settings if corresponding identifiers are found.

DETAILED DESCRIPTION OF THE PREFERRED EMBODIMENTS

Figure 1:
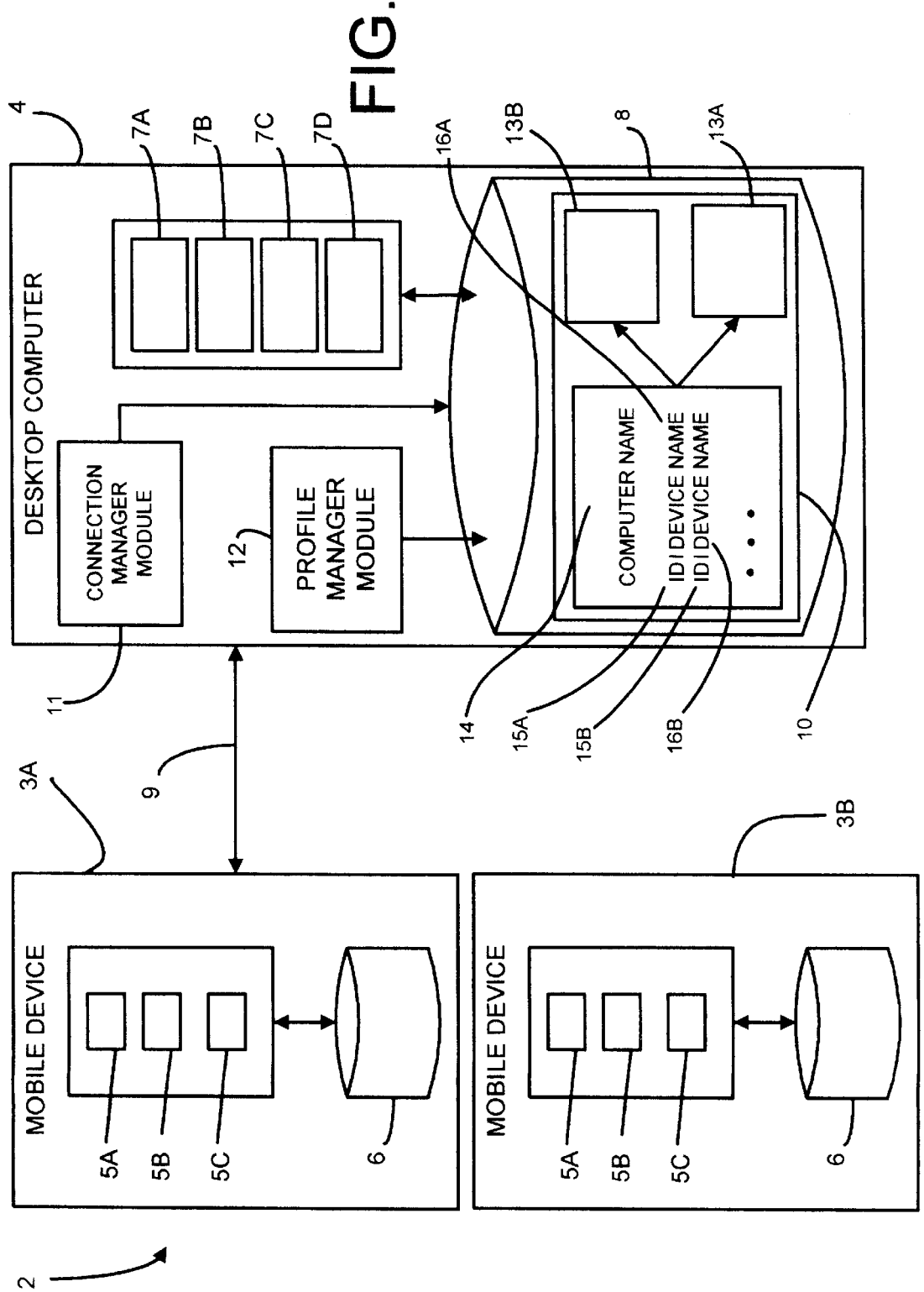
FIG. 1 is a block diagram illustrating an operating environment of the present invention.

FIG. 1 is a block diagram of a typical system or environment 2 in which the present invention operates. The environment 2 includes a first mobile device 3A and a second mobile device 3B. Each of the mobile devices 3A and 3B includes one or more application programs indicated at 5A, 5B and 5C, and a store 6 used to store objects, data files and/or databases used by the application programs 5A–5C. A computer, herein illustrated as a desktop computer 4, also includes one or more application programs indicated at 7A, 7B, 7C and 7D, and a store 8 used to store objects, data files and/or databases used by the application programs 7A–7D. In some circumstances, it is desired that at least some of the objects on stores 6 and 8 be either copied or transferred in order that the user can access the same information regardless as to whether the mobile device or the desktop computer 4 is being used. Although illustrated wherein each mobile device 3A and 3B includes the same application programs 5A–5C, it should be understood that each mobile device 3A and 3B can be individually configured as desired by each respective user to contain one or a number of application programs, some of which can correspond to application programs 7A–7D residing on the desktop computer 4. It should also be understood that the mobile devices 3A and 3B need not be made from the same manufacturer, nor even identical to operate in the present environment 2. In other words, the mobile devices 3A and 3B can be manufactured by different vendors using different CPU platforms and having different operating characteristics. However, each of the mobile devices 3A and 3B are connectable to the desktop computer 4 using one of a plurality of known connection mechanisms 9, such as a serial connection, an infrared link or a modem connection. In the embodiment illustrated, the mobile device 3A is connected to the desktop computer 4 using the connection mechanism 9. Alternatively, when it is desired, the mobile device 3B can be connected to the desktop computer 4 using the connection mechanism 9. Although illustrated wherein two mobile devices 3A and 3B can be connected to the desktop computer 4, if desired, additional mobile devices manufactured by the same or different vendors of mobile devices can also be connected to the desktop computer 4.

Generally, the desktop computer 4 also includes partnership information indicated at 10 that is stored in store 8. The partnership information 10 comprises settings or parameters to control aspects of the connection and data transfer process when each mobile device 3A and 3B is connected. Upon initial connection of a new type of mobile device 3A or 3B to the desktop 4, default settings, previously stored on the desktop computer 4, are obtained based on the type of mobile device connected. If desired, at least some to almost all of the default settings can be changed by the mobile device user.

In one embodiment, the partnership information 10 corresponding to each mobile device 3A and 3B is stored on the desktop computer 4 and is accessed each time the user connects the mobile devices 3A and 3B thereto. Thus, each user need not have to reestablish his or her user preferences each time the mobile device 3A or 3B is connected. In a preferred embodiment, the partnership information 10 includes any unique settings for each unique type of mobile device being connected to the desktop computer 4. In this manner, the mobile devices 3A and 3B need not be the same type. The partnership information 10 can be stored remote from the desktop computer 4. If desired, some of the partnership information 10, for example, some or all of the user settings, can be stored on each of the respective mobile devices 3A and 3B, which would then be accessible by the desktop computer 4. Likewise, the partnership information 10 can also be stored, for example, on a network server that is accessible to the desktop computer 4. Typically, the partnership information 10 on the desktop computer 4 includes a record of the partnership with the mobile device and a module to access any relevant user setting pertaining to the partnership no matter where they are stored.

The partnership information 10 is preferably organized under unique identifiers stored at 15A and 15B assigned, for example, during initial formation of each partnership. The unique identifiers are stored on the desktop computer 4 and stored separately on each of the mobile devices 3A and 3B. In addition to the unique identifiers stored at 15A and 15B, device names can also be stored at 16A and 16B in the partnership information 10 along with the name of the computer 4 stored at 14. The partnership information 10 includes configuration settings for services used by the user to transfer or copy data between the connected mobile device 3A or 3B and the desktop computer 4 as well as data necessary to perform a service. As used herein, a "service" is a single or group of functions made available to the mobile device that connects to the desktop computer 4 with the service installed. For example, a "Synchronization Service" is a service that specializes in the transfer of data between the connected mobile device 3A and the desktop computer 4, including replications, automatic file copy and/or update. Other services include a file conversion service that converts files between the connected mobile device 3A or 3B and the desktop computer 4 (for example, when the user specifies that one or a plurality of files be separately copied) so that data files can be accessed by each respective application program residing thereon. Another service includes synchronizing time and date clocks of the connected mobile device 3A and the desktop computer 4.

A profile manager module 12 residing on the desktop computer 4 detects connection of the mobile device 3A or 3B to the desktop computer 4 and stores and/or accesses the partnership information 10 in the store 8 to allow each user convenient access to the desktop computer 4 and the partnership information 10 stored thereon. As will be explained, the partnership information 10 is stored as individual profile areas 13A and 13B corresponding to each of the respective mobile devices 3A and 3B. In one embodiment, the profile areas 13A and 13B comprise registry subkeys and individual profile folders for storing partnership specific information.

Before describing aspects of the present invention, a brief description of the desktop computer 4 and a typical mobile device, such as mobile device 3A, will be helpful.

Figure 2:
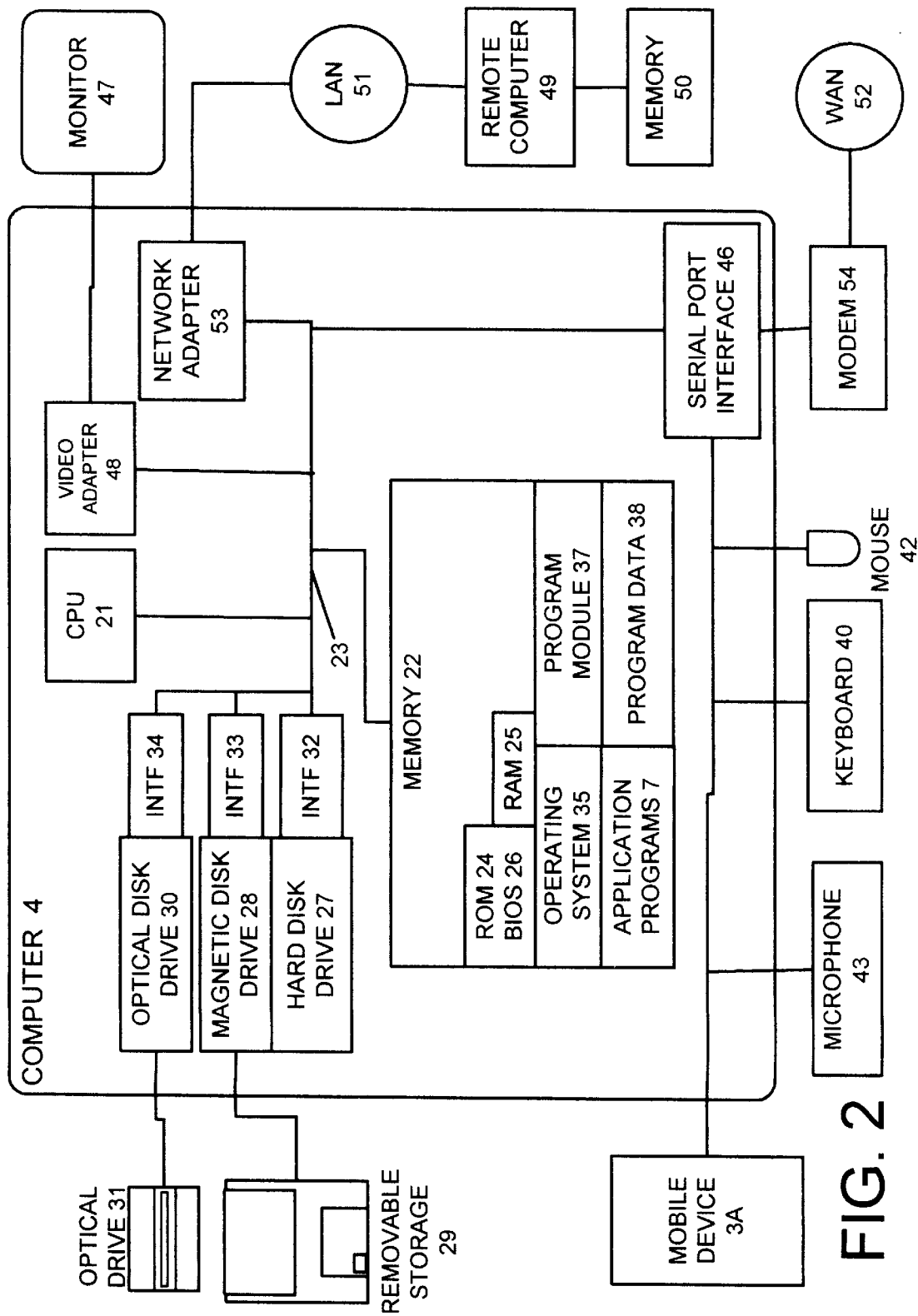
FIG. 2 is a block diagram of one embodiment of a conventional desktop computer used in conjunction with a mobile device.
Figure 3:
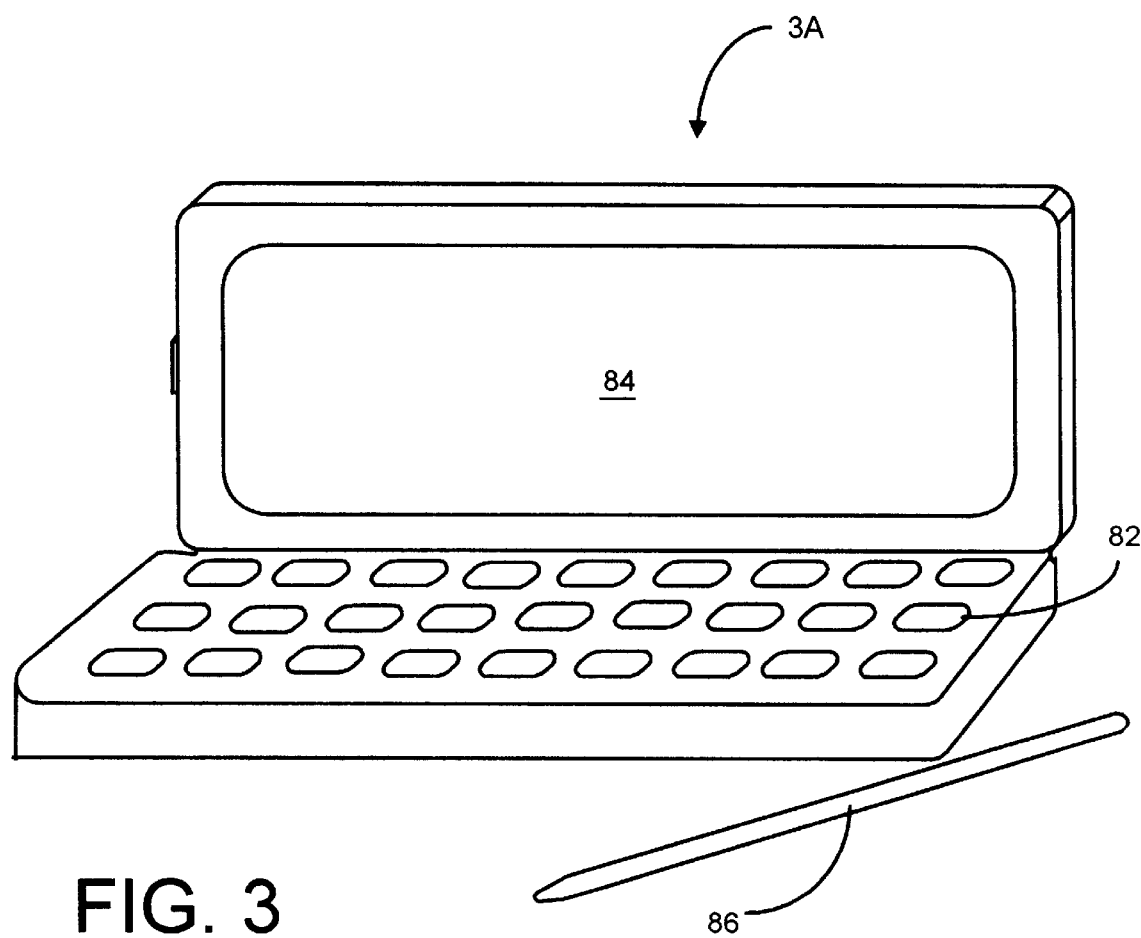
FIG. 3 is a simplified pictorial illustrating one embodiment of the mobile device in accordance with the present invention.
Figure 4:
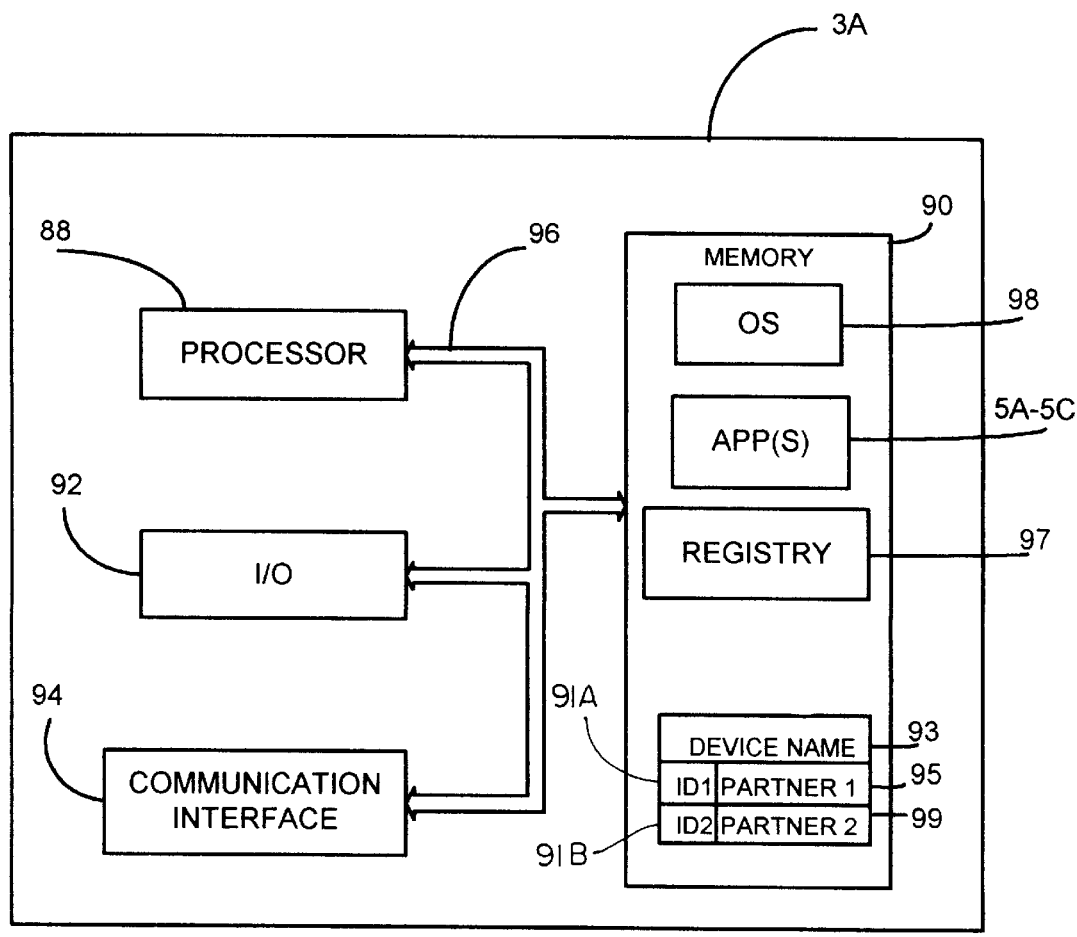
FIG. 4 is one embodiment of a simplified block diagram of the mobile device shown in FIG. 3.

FIGS. 2, 3 and 4 and the related discussion are intended to provide a brief, general description of a suitable computing environment in which the invention may be implemented. Although not required, the invention will be described, at least in part, in the general context of computer-executable instructions, such as program modules, being executed by the desktop computer 4 or the mobile devices 3A and 3B. Generally, program modules include routine programs, objects, components, data structures, etc., that perform particular tasks or implement particular abstract data types. Moreover, those skilled in the art will appreciate that the invention may be practiced with other computer system configurations, including other handheld devices, such as palmtop computers, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 2, an exemplary system for implementing the invention includes a general purpose computing device in the form of a conventional personal or desktop computer 4, including a central processing unit (CPU) 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output system (BIOS) 26, containing the basic routine that helps to transfer information between elements within the desktop computer 4, such as during start-up, is stored in ROM 24. The desktop computer 4 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and the associated computer-readable media provide non-volatile storage of computer readable instructions, data structures, program modules and other data for the desktop computer 4.

Although the exemplary environment described herein employs the hard disk, the removable magnetic disk 29 and the removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more of the application programs 7A–7D, other program modules 37, and program data 38. A user may enter commands and information into the desktop computer 4 through input devices such as a keyboard 40, a pointing device 42 and a microphone 43. Other input devices (not shown) may include a joystick, game pad, satellite dish, scanner, or the like. These and other input devices are often connected to the processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices, such as a speaker and printers (not shown).

The desktop computer 4 may operate in a wired or wireless networked environment using logic connections to one or more remote computers, such as a remote computer 49. The remote computer 49 may be another personal computer, a server, a router, a network PC, a peer device or other network node, and typically includes many or all of the elements described above relative to the desktop computer 4, although only a memory storage device 50 has been illustrated in FIG. 2. The logic connections depicted in FIG. 2 include a local area network (LAN) 51 and a wide area network (WAN) 52. Such networking environments are commonplace in offices, enterprise-wide computer network Intranets and the Internet.

When used in a LAN networking environment, the desktop computer 4 is connected to the local area network 51 through a network interface or adapter 53. When used in a WAN networking environment, the desktop computer 4 typically includes a modem 54 or other means for establishing communications over the wide area network 52, such as the Internet. The modem 54, which may be internal or external, is connected to the system bus 23 via the serial port interface 46. In a network environment, program modules depicted relative to the desktop computer 4, or portions thereof, may be stored in the remote memory storage devices, not shown. It will be appreciated that the network connections shown are exemplary and other means of establishing a communications link between the computers may be used. In the embodiment illustrated, the mobile device 3A also connects to the desktop computer 4 through the serial port interface 46.

The desktop computer 4 runs an operating system that is stored in any of the memory storage devices illustrated in FIG. 2 and executes on the processing unit 21. One suitable operating system is a "WINDOWS" brand operating system sold by Microsoft Corporation, such as "WINDOWS 95" or "WINDOWS NT", or other derivative versions of Windows brand operating systems, or another suitable operating system. Other suitable operating systems include systems such as "MACINTOSH OS" sold by Apple Corporation, and the "OS/2 PRESENTATION MANAGER" sold by International Business Machines (IBM).

FIG. 3 is a pictorial illustration of one preferred embodiment of the mobile device 3A which can be used in accordance with the present invention. The mobile device 3A, in one embodiment, is a desktop assistant sold under the designation H/PC. The mobile device 3A has some components which are similar to those of the desktop computer 4. For instance, in one embodiment, the mobile device 3A includes a miniaturized keyboard 82, a display 84 and a stylus 86. The display 84 can be a LCD display having a contact-sensitive screen used in conjunction with the stylus 86. The stylus 86 is used to press or contact the display 84 at designated coordinates to accomplish certain user input functions. Of course, other configurations could be used as well. For example, user input mechanisms could be included such as a keypad, a track ball, and various types of miniaturized keyboards, or the like. In addition, the mobile device 3A may not be embodied as the H/PC brand of desktop assistant, but could also be implemented as another type of personal digital assistant (PDA), another personal organizer, a palmtop computer, a similar computerized notepad device, a phone or a pager.

FIG. 4 is a more detailed block diagram of the mobile device 3A. The mobile device 3A preferably includes a microprocessor 88, memory 90, input/output (I/O) components 92 (which include the keyboard 82, and the touch sensitive display 84 and a serial interface 94). In one embodiment, these components are coupled for communication with one another over a suitable bus 96. The memory 90 can be implemented as non-volatile electronic memory such as a random access memory (RAM) with a battery back-up module (not shown) such that information stored in the memory 90 is not lost when the general power to mobile device 3A is shut down. A portion of memory 90 is preferably allocated as addressable memory for program execution, while the remaining portion of memory 90 is preferably used to simulate storage on a disk drive where memory 90, of course, can function as the store 6 in FIG. 1.

Memory 90 includes an operating system 98 and the application programs 5A–5C. The operating system 98, during operation, is preferably executed by the microprocessor 88. The operating system 98, in one embodiment, is the "WINDOWS CEI " brand operating system commercially available from Microsoft Corporation. The operating system 98 is preferably designed for mobile devices. The objects in the store 6 are preferably maintained by the application programs 5A–5C and the operating system 98, at least partially in response to calls to the exposed application program interfaces and methods. The application programs 5A–5C are not necessarily designed to be entirely compatible with corresponding application programs 7A–7D which execute on the desktop computer 4. For instance, there may not be precise one-to-one matching between the properties of specific object types.

In addition to the application programs 5A–5C and the operating system 98, memory 90 further stores a registry 97 used in operating systems such as Windows CE brand operating systems. The use of registries such as the registry 97 is conventional and provides information relating to the application programs 5A–5C installed on the mobile devices 3A and 3B. In a preferred embodiment, the registry 97 stores user settings of the application as well as where particular files are to be stored in tree-type directories, which is a common technique used in many operating systems. For particular use in the present invention, the memory 90 further stores identifiers at 91A and 91B. The identifiers are unique for each partnership formed between the mobile device 3A and 3B and partnered computers, such as the desktop computer 4. By making the identifiers stored at 91A and 91B unique for each partnership formed, the mobile device 3A or 3B can have many partnerships with the desktop computer 4 for different uses, or a plurality of partnerships with different desktop computers. In one embodiment, the identifier stored at 91A corresponds to one of the profile areas 13A or 13B in the desktop computer 4, while the identifier stored at 91B corresponds to a profile area in another desktop computer. In a further embodiment, the mobile device 3A also stores a "Device Name" at 93 given by the user, as well as names at 95 and 99 of one or more desktop computers 4 that the mobile device 3A has been partnered with. If desired, this information can be stored in a part of the registry 97 or stored separately from the registry 97. In one embodiment, the desktop computer 4 stores similar information, including the name of the desktop computer 4, and for each partnership, the identifiers at 15A and 15B and the respective names at 16A and 16B of each partnered mobile device 3A or 3B.

In order to provide easy and convenient interaction between the desktop computer 4 and a connected mobile device, for example, mobile device 3A illustrated in FIG. 1, it is preferable that the mobile device type or class first be registered with the desktop computer 4 so that upon connection of the mobile device 3A with the desktop computer 4, the desktop computer 4 can recognize the exact type or class of mobile device being connected and already have available appropriate parameter settings to interact with it. In one embodiment, registration includes copying a default profile information 100 such as a group of registry settings and/or default files into store 8 (FIG. 1) containing all necessary parameters to allow the desktop computer 4 to interact with the mobile device 3A. The default profile information 100 is then used when creating a user specific profile area, such as profile area 13A, or interacting with the desktop computer 4 as a guest, as discussed below. In one embodiment, a manufacturer of the mobile device 3A to be registered on the desktop computer 4 provides information each time it is connected to the desktop computer 4. This information can be obtained using suitable API calls known and used commonly in the art between devices. The information provided by the mobile device when connected to the desktop computer 4 is compared to other stored information during the registration process in order to detect the type of mobile device 3A being connected. Although in one embodiment, registration occurs during execution of a "setup program" provided by the manufacturer and executed on the desktop computer 4 to copy files from any of the removable mediums such as a CD disk, if desired, all registration information could be stored on the mobile device 3A and downloaded to the desktop computer 4 upon initial connection.

Figure 5:
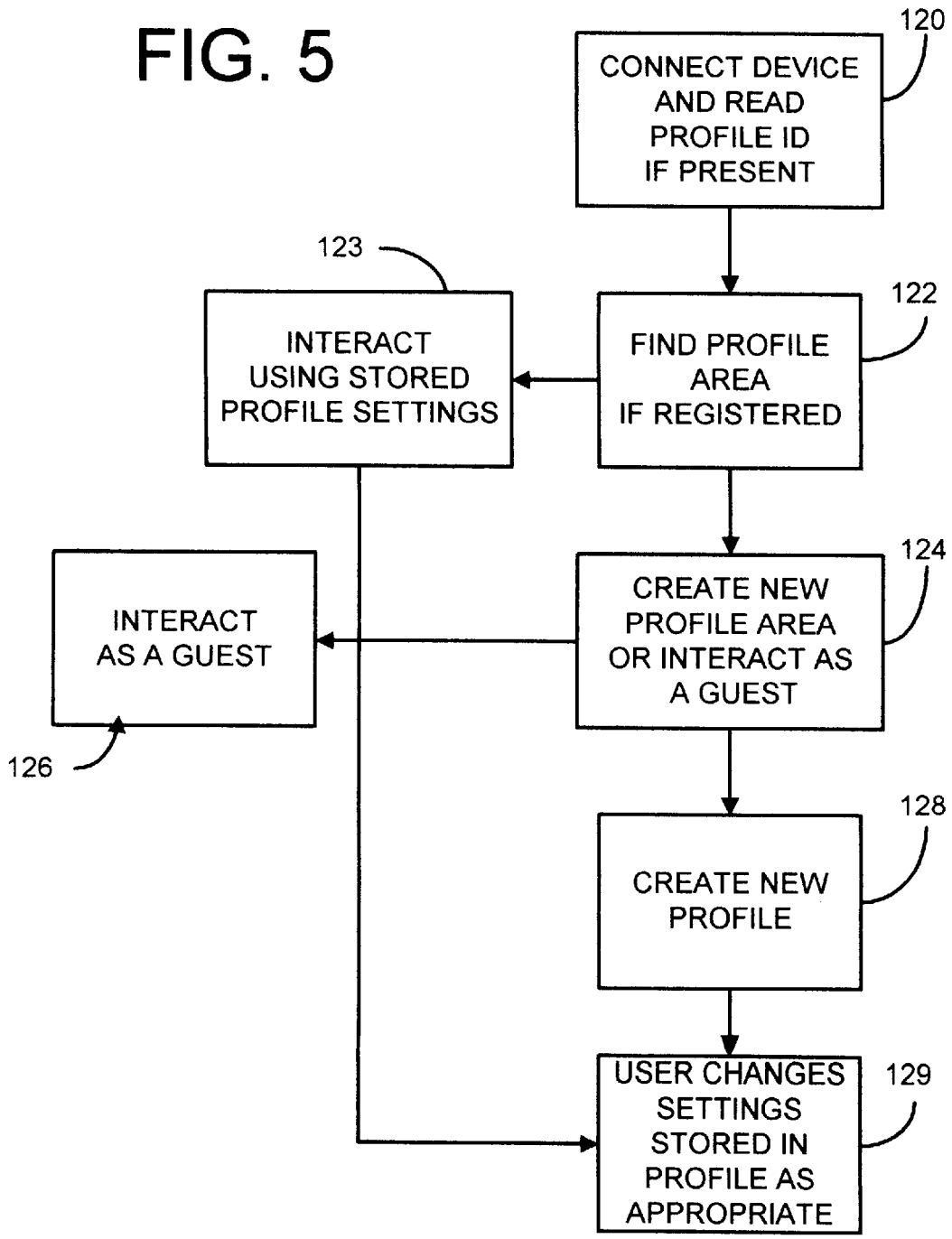
FIG. 5 is state or flow diagram illustrating operation of a profile manager module.

FIG. 5 is a state or flow diagram illustrating various operating states and actions performed by the profile manager module 12. At state 120, the mobile device 3A is connected (if not already connected from the registration procedure) and the profile identifier 91A is read, if present. Operation then continues to state 122. At stated 122, the profile manager module 12 examines all of the stored profile identifiers in the partnership information 10 to determine if a match exists. In the exemplary embodiment, each profile area 13A and 13B stored in the desktop computer 4 is identified by a unique identifier (profile identifier) that is assigned at profile area creation time by a random number generator. The profile identifier is stored in the profile areas 13A and 13B, preferably along with a unique device name, a description of the mobile device and other device data. The profile identifier is used by the desktop computer 4 to refer to each particular profile area 13A and 13B stored therein. As discussed above, the profile areas 13A and 13B contain data or settings that are needed to provide the desired services to the connected mobile device 3A. The profile areas 13A and 13B stored in the desktop computer 4 correspond to the connected mobile devices 3A and 3B. Preferably, the mobile device 3A has one profile area 13A and 13B with the desktop computer 4. However, since unique profile identifiers are used for each partnership, it would be possible for the mobile device 3A to have multiple partnerships with the same desktop computer 4. A suitable user interface either on the desktop computer 4 or on the mobile device 3A would query the user as to which of the stored profile areas to use. Nevertheless, the data in each profile area 13A and 13B pertains to only that partnership and will not affect any other partnership. If a profile area 13A is found based on the profile identifier stored at 91A, operation of the profile manager module 12 proceeds to state 123, whereat the stored user settings are used and provided to any required service.

If either the connected mobile device 3A or the desktop computer 4 has no profile identifiers in its list, or no match is found, operation of the profile manager module 12 proceeds to state 124. At state 124, the user is queried through a suitable user interface (UI) dialog box provided on the desktop computer 4 as to whether the user would like to log on as a guest or create a new user specific profile area 13A.

If a user decides to interact as a guest, operation of the profile manager module 12 proceeds to state 126. At state 126, the profile manager module 12 uses the information gathered at connection, identifying the type of mobile device connected, and selects the correct default profile information 100 stored during the registration procedure. In one embodiment, one set of global or common default settings are stored in store 8 to be used by all devices unless otherwise overwritten. Each service has appropriate default settings for that service stored in this area. At the time of connection of the mobile device 3A, the default settings are copied for use as guest profile settings 101, if the user connects as a guest, or copied as new partnership profile settings discussed below, if the user elects to create a new partnership. The system then looks to see if there are default settings that should be changed based on the type of mobile device 3A detected. These default setting changes were stored during the registration of the mobile device 3A with the desktop computer 4.

As a guest, the user could have access to all services available to partnered users, or to only a limited number of services. For example, the user may be limited to browsing the mobile device contents, transfer and/or organizing files on the mobile device 3A, or performing file conversion. In other situations, additional services may be provided such as synchronizing the clock of the mobile device 3A to the clock of the desktop computer 4 or loading application programs from the desktop computer 4 onto the mobile device 3A. Some of the settings may be adjustable and adjusted for the connection session, for example, a certain file conversion format to be used. However, at the end of the connection session when the user disconnects the mobile device 3A from the desktop computer 4, these settings will be lost. In the event the desktop computer 4 does not recognize the type of mobile device, a further limited number of services that are not dependent on the type of mobile device can be made available. In yet a further embodiment, if the mobile device user first connects as a guest, but then later decides to setup a partnership, the desktop computer 4 can query the user in the manner described below and save the guest profile settings 101 in a unique profile area 13A.

Figure 6:
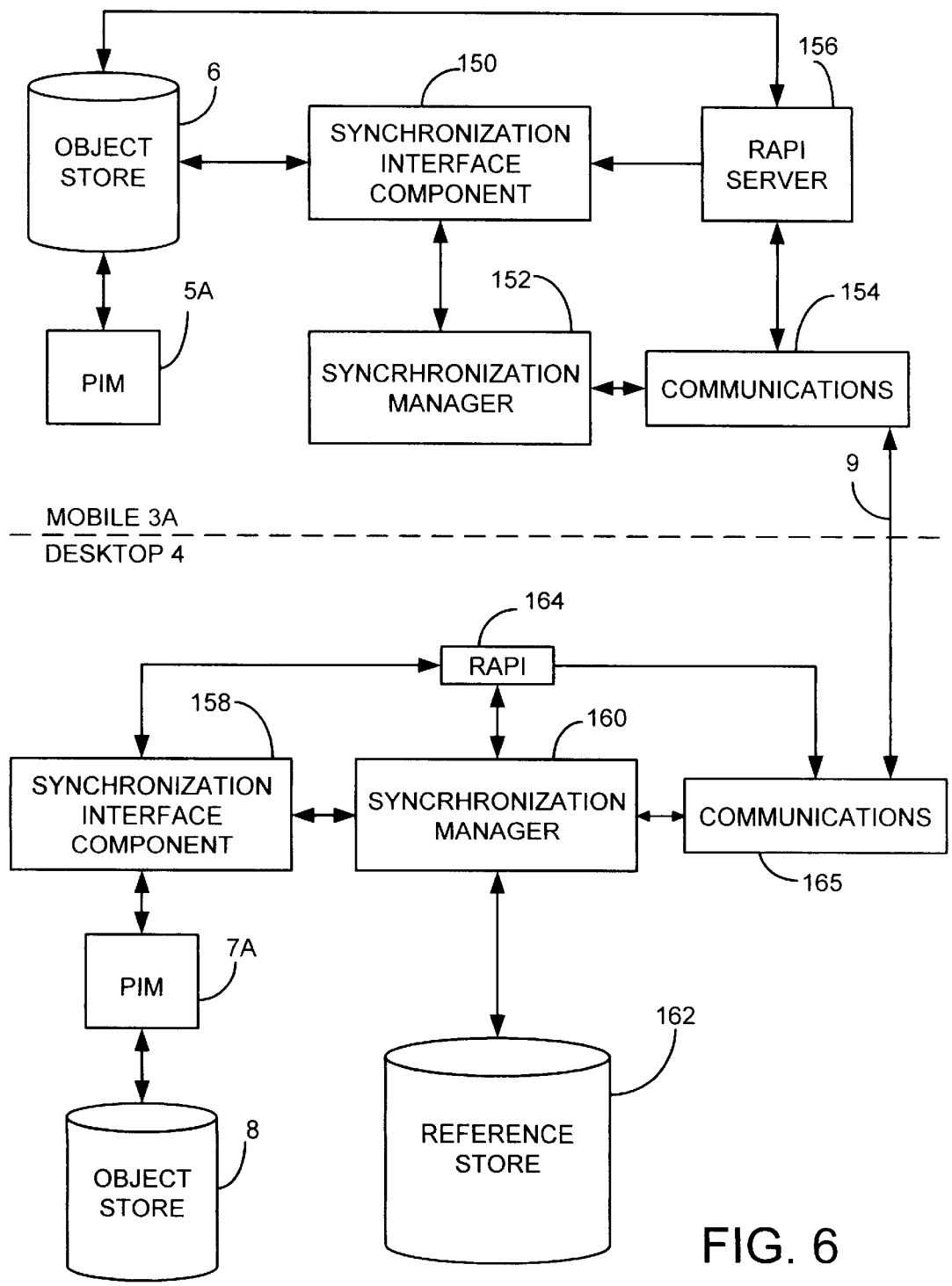
FIG. 6 is an architectural block diagram illustrating one embodiment of portions of the desktop computer shown in FIG. 2 and the mobile device shown in FIGS. 3 and 4 to illustrate synchronization of information stored in object stores on the desktop computer and the mobile device.

If the user will not be interacting with the desktop computer 4 as a guest, the user can create a new profile area which will be stored on the desktop computer 4, and which is represented in FIG. 6 at state 128. The profile manager module 12 sets aside storage in the store 8 for the new profile area. In one preferred embodiment, a subkey is created in the registry of the desktop computer 4 for the mobile device 3A and a folder in file space on the store 8 is created. The profile manager module 12 obtains a copy of the default profile information 100 corresponding to the type of mobile device connected as discussed above and stores it in one or both of these areas as appropriate. For example, default files can be stored in the file area or folder.

The profile manager module 12 assigns the profile identifier which will be stored in the profile area 13A and in the mobile device 3A at 91A. Preferably, the user is then queried to enter a unique device name for the connected mobile device 3A. In one embodiment, the default name of the mobile device 3A is obtained directly from the mobile device 3A and the user is asked whether it should be changed. In the embodiment illustrated, the unique device name is required so that the profile area 13A can be stored on the desktop computer 4 in a manner more easily recognizable to the user than under the profile identifier stored at 15A. As discussed above, the desktop computer 4 can store the profile area 13A under a directory of folder having the unique device name. In this manner, the user can locate the profile area 13 on the desktop computer 4 and access the profile area 13A through a suitable interface module that allows the user to change any of the service settings, or even delete the profile area 13A partnership information, and thus discontinue the partnership. In addition, if the user changes the unique device name stored at 93 on the mobile device 3A, for example, when the mobile device 3A is not connected to the desktop computer 4, upon reconnection to the desktop computer 4, the profile manager module 12 determines that the mobile device 3A does have an associated profile area 13A stored on the desktop computer 4 based on a comparison of the profile identifiers. However, the profile manager module 12 will also detect that the unique device name stored at 93 of the mobile device 3A has been changed. If the new unique device name stored at 93 for the mobile device 3A is not already present on any of the other profile areas 13A and 13B stored on the desktop computer 4, the profile manager module 12 will make appropriate corrections to the directory name in which the profile area is stored.

In the preferred embodiment, a step in forming a partnership between the mobile device 3A and the desktop computer 4 involves retaining the desktop computer 4 name at 95 or 99 in the mobile device 3A. In one embodiment, the mobile device 3A is allowed to "partner" with up to two different desktop computers 4. Each of the names stored 95 and 99 of the desktop computers that the mobile device 3A is partnered with is retained in the mobile device 3A along with the unique profile identifiers 91A and 91B as described above.

In a preferred embodiment, the mobile device 3A is limited in the number of desktop computers that it can be partnered with. For example, the mobile device 3A can be limited to form only two partnerships with the desktop computers. If the user attempts to form a partnership with a desktop computer in excess of those allowed, the user is prompted as to which previous desktop computer partner should be deleted prior to forming a profile area on the new desktop computer and, thus, forming a partnership therewith. If the user chooses not to form a new partnership with a new desktop computer, or has formed all allowable partnerships, the user can create the guest profile area 101 with the desktop computer and interact as a guest.

After the profile area 13A has been successfully created and stored on the desktop computer 4 and a partnership has been formed, the profile manager module 12 can access various settings and present the settings to the user to capture user preferences for mobile device services. In one embodiment, the service provider provides all user interfaces necessary to change the settings, where the user interfaces are stored on the desktop computer 4 and accessible to the profile manager module 12. In this manner, the profile manager module 12 can accommodate new services easily. In one embodiment, the profile manager module 12 assists the user in specifying information that the service needs in order to provide the service to the mobile device. Generally, the user will be provided an opportunity to change commonly adjusted settings for common services. Appropriate default values will be provided for all service settings. Preferably, appropriate defaults for each setting are provided such that the user will not need to adjust settings, except in special situations. Examples follow for settings that do not have obvious defaults. For example, if the synchronization service is used in order to synchronize a calendar application provided on the desktop computer 4 with a calendar application provided on the mobile device 3A, the synchronization service needs to know which calendar applications and data files are being used. Likewise, a preference can be set in the user settings to resolve conflicts between similar objects stored in the mobile device 3A and the desktop computer 4. For example, the user can modify the user setting in the profile area 13A indicating that if any conflicts were to arise, the synchronization service should resolve the conflict automatically and use the value or objects stored on the desktop computer 4. Likewise, if the user prefers, the user can modify this setting and resolve the conflict in favor of the value or the object stored in the mobile device 3A. In yet a further example, the user can modify this setting so that the user is prompted during synchronization to resolve the conflict manually.

Another user setting can be modified in the profile areas 13A and 13B to indicate that upon connection of the mobile device 3A to the desktop computer 4, the time and/or date residing on the mobile device 3A will be synchronized with that of the desktop computer 4.

Other user settings in the profile area 13A can be used to indicate automatic file conversions when the user either synchronizes data or transfer files between the mobile device 3A and the desktop computer 4. Typically, default settings are provided by the manufacturer upon registration of the mobile device 3A with the desktop computer 4 which are then subsequently copied when a new profile area 13A and 13B is created. Default settings can also be supplied by new services available on the desktop computer 4. The default settings will thus allow application programs residing on the mobile device 3A to synchronize with similar application programs found on the desktop computer 4, but stored in a different format. Many times, the user will not need to change these default settings. However, in some circumstances, it may be necessary for the user to select automatic file conversion when the application programs residing on the mobile device 3A differ from the application programs residing on the desktop computer 4. For instance, the user may have a first type of word processor residing on the mobile device 3A and a second type of word processor residing on the desktop computer 4. In order to obviate the need for either one of the word processors to read a document stored in the other format, by modifying the user settings in the profile area 13A, the user can specify that file conversion take place automatically upon file transfer.

Another service available to the user is a "backup/restore" service. This service allows the user to backup data contents stored in the mobile device 3A to the desktop computer 4 and, in the event of data loss, restore any or all of the backed up files. In view that many mobile devices can be partnered with the desktop computer 4, it is preferable to store the backup files in a manner such that they are not overwritten. In the present invention, the profile folders have the unique device name of each mobile device 3A and 3B and are used to store all file-based information that is specific to the mobile device 3A and 3B, including backup files. Special care may have to be taken when the user elects to restore to a mobile device. The restore operation also restores the partnership information 10 to the mobile device (the profile identifiers stored at 91A and 91B and the partnered computer names stored at 95 and 99). If mobile devices are allowed to restore the profile identifier intact, several identical mobile devices can be created having the same profile ID. This would allow several mobile devices to connect to the desktop computer 4 and use the same profile area 13A. This could easily result in confusion to the user, if not data loss. To prevent this, one or more of the profile identifiers stored on the mobile device 3A are invalidated when they are restored. A new profile identifier will be stored at 91A on the mobile device 3A at restore time for the current desktop computer 4 partnership. The desktop computer 4 will then immediately delete the old profile identifier and insert the new profile identifier where necessary.

Another aspect of the present invention includes synchronization of data between a mobile device and computers of at least two partnerships. For purposes of explanation, this aspect of the present invention will be described in the context of a personal information manager (PIM). PIMs typically comprise applications which enable the user of the mobile device to better manage contacts, scheduling, communications and other such tasks. Some commercially available PIMs are sold under the brand name "SCHEDULE+" and "OUTLOOK" by the Microsoft Corporation. Hereinafter, application program 7A is a PIM program and will simply be referred to as PIM 7A. Object store 8 is memory which is configured to store a plurality of individual records or objects, each comprising a plurality of fields or properties related to PIM data. Desktop computer 4 executes the application program identified as PIM 7A to maintain objects stored in object store 8.

In this illustrative embodiment, the application program designated as 5A for mobile devices 3A and 3B is a similar PIM to that stored on desktop computer 4. Object stores 6 on mobile devices 3A and 3B are configured to store a plurality of individual records or objects, each comprising a plurality of fields or properties related to PIM data. Each mobile device 3A and 3B executes PIM 5A to maintain the objects in each respective object store 6.

With respect to mobile device 3A for purposes of explanation, each object stored in object store 8 can also be stored in object store 6. However, there are actually two instances of each object (one in object store 6 and one in object store 8). Thus, when a user changes one instance of the object stored in either store 6 or store 8, the second instance of that object in the other of stores 6 and 8 is preferably updated the next time mobile device 3A is connected to desktop computer 4 so that both instances of the same object contain up-to-date data. This is referred to as synchronization.

In order to accomplish synchronization, synchronization components run on both mobile device 3A and desktop computer 4. The synchronization components communicate with PIMs 5A and 7A on mobile device 3A and desktop computer 4 through well defined interfaces to manage communication and synchronization.

The synchronization components of mobile device 3A and desktop computer 4 preferably communicate with each other using socket services (such as Winsock services) which may use any suitable, and commercially available, communication mechanism 9, and using a suitable communications protocol. For instance, in one preferred embodiment, mobile device 3A is connectable to desktop computer 4 with a physical cable which communicates using a serial communications protocol. Other communication mechanisms are also contemplated by the present invention, such as infrared (IR) communication, direct modem communication, remote dial-up networking communication, communication through commercially available network cards (i.e., using TCP/IP), remote access services (RAS), wireless modem, wireless cellular digital packet data (CDPD), or other suitable communication mechanisms.

FIG. 6 is an architectural block diagram illustrating one embodiment of architectural components of mobile device 3A and desktop computer 4 which are used in synchronizing objects stored in object store 6 on mobile device 3A and object store 8 on desktop computer 4. In addition to PIM 5A and object store 6, mobile device 3A includes synchronization interface component 150, synchronization manager 152, communications component 154 and remote application programming interface (RAPI) server 156.

Desktop computer 4 includes, in addition to PIM 7A and object store 8, synchronization interface component 158, synchronization manager 160, reference store 162, RAPI component 164, and communications component 165. Many of the components shown in FIG. 6 are used primarily to implement a suitable synchronization protocol.

Generally, synchronization manager 160 executes on desktop computer 4 and orchestrates synchronization between objects in object store 6 in mobile device 3A, and objects in object store 8 in desktop computer 4. Synchronization manager 160 also maintains reference store 162 apart from desktop object store 8 as is described in greater detail below. Synchronization manager 160 implements the synchronization protocol to allow a comparison between corresponding objects stored in object store 6 in mobile device 3A and object store 8 in desktop computer 4, to receive objects from object store 8, and to update objects in object store 8. The synchronization protocol also facilitates the retrieval of objects stored in object store 6 in mobile device 3A through synchronization interface component 150 and synchronization manager 152, as well as communications component 154.

On the side of mobile device 3A, the synchronization interface component 150 exposes application programming interfaces which synchronization manager 152 calls to read and store objects and object properties on object store 6. In general, the application programming interfaces allow the creation of databases for different types of objects, and allow application programs to write and read property names and values to and from respective objects within object store 6.

As discussed above, PIM 5A executes on mobile device 3A and maintains object store 6. PIM 7A executes on desktop computer 4 and maintains object store 8. There are many different ways which PIMs 5A and 7A can store objects in object stores 6 and 8. However, in one embodiment, PIMs 5A and 7A create a distinct database for each object type. For example, different databases are created for appointments, tasks, electronic mail messages, etc. A predefined set of properties is supported for each object type, and each of the databases is assigned a name by the application program that creates it.

In an alternative embodiment, the application programs in PIMs 5A and 7A may use a single database for all object types, with the first property of each object defining the type of object. In any case, objects are uniquely identified within mobile device 3A and desktop computer 4 by object identifiers which are independent of the names assigned by the application programs creating the object.

Synchronization manager 160 is not necessarily closely associated with PIM 7A. Rather, it is an independent component which synchronizes objects from any application program that supports the appropriate desktop synchronization interfaces. Communication components 154 and 165 implement serial communications between the computers using connection mechanism 9.

Synchronization manager 160 communicates with PIM 7A and accesses object store 8 through synchronization interface component 158. Synchronization interface component 158 corresponds generally to a dynamic linked library (DLL), and exposes one or more application program interfaces and methods. The interfaces and methods are preferably of the form known as store interfaces such as IreplStore and IreplObjHandler developed and published by the Microsoft Corporation for "WINDOWS" brand operating system platforms. Those interfaces may, in turn, use interfaces such as messaging application programming interfaces (MAPI) and/or OLE Automation (or any other application programming interface) to communicate with the underlying PIM and object store. In one embodiment, the MAPI exposed by component 158 is a C-language application programming interface which allows programmable access to features of an electronic mail messaging program known as Exchange also commercially available from the Microsoft Corporation. In another embodiment, the MAPI exposed by component 158 is a component object model based (COM-based) set of interfaces which is sometimes referred to as extended MAPI and includes a set of automation interfaces to messaging systems, for use in Visual Basic and the like. However, synchronization interface component 158 and the associated application program interfaces and methods can be any suitable synchronization interface components designed for any particular application in PIM 7A. Because the application program interfaces are preferably standardized, they allow synchronization manager 160 to access and synchronize any number of different desktop PIMs, as long as the required interface methods are implemented for each PIM.

Reference store 162 provides a mapping between instances of objects stored in object store 6 on mobile device 3A and objects stored in object store 8 on desktop computer 4. Since the same object identifiers are not used by PIM 5A to identify objects on object store 6 as are used by PIM 7A to identify objects in object store 8, this mapping is required.

Synchronization manager 160 maintains reference store 162 so that reference store 162 contains the identifying data segments corresponding respectively to a plurality of object instances in object store 8 on desktop computer 4 that are to be synchronized with instances of the same object in object store 6 on mobile device 3A. The identifying data segments are updated each time corresponding object instances have been synchronized.

The exact composition of an identifying data segment which is used to identify the particular object instances are assignable by the developer of the desktop synchronization interface component 158, and are then handled and stored by synchronization manager 160. The identifying data segments preferably include some sort of time stamp information which can be compared to determine whether an object has changed since the identifying data segment was last recorded in reference store 162.

In addition to maintaining a plurality of identifying data segments, synchronization manager 160 also maintains a list of object identifiers corresponding to objects maintained in object store 6. These identifiers are provided to synchronization manager 160 whenever a new object is added to object store 6 on mobile device 3A.

The protocol by which full synchronization is accomplished with the present system is described in greater detail in U.S. patent application Ser. No. 08/958,658 filed Oct. 27, 1997, now U.S. Pat. No. 6,125,369 issued on Sep.26, 2000, entitled "OBJECT SYNCHRONIZATION BETWEEN OBJECT STORES ON DIFFERENT COMPUTERS" assigned to the same assignee as the present application, and which is fully incorporated by reference. However, a brief discussion of that protocol is helpful in understanding the context of the present invention. In order to synchronize objects, synchronization manager 160 first creates two lists of handles which refer to particular objects. The term "handle" refers to a number or other identifier that can be used to uniquely identify an object and to access the object. Generally, a handle is valid for a particular time period or session, such as during the time when an object has been "opened". If the same object is opened again, its handle may be different.

The first list of handles is obtained from reference store 162 and is indicative of objects which have been synchronized in the past and are identified in reference store 162. The second list of handles is a list which identifies the objects stored on object store 8. The two lists of handles are compared against one another to determine whether the same objects are stored in reference store 162 and object store 8.

If an object is identified in reference store 162, but not in object store 8, that particular object has been deleted from the desktop 4 since the last synchronization. On the other hand, if an object is identified in object store 8, but it does not appear in reference store 162, then it has been added to the desktop since the last synchronization. In either case, synchronization manager 160 determines how to handle the object. In one preferred embodiment, those objects which have been deleted from desktop object store 8 are also deleted from reference store 162. Further, those which have been added to object store 8 are also added to reference store 162.

Synchronization manager 160 then determines whether any of the objects stored in object store 8 have been modified at the desktop since the last synchronization. In other words, if handles corresponding to the same object appear in both object store 8 and reference store 162, but they are not identical (such as the time stamp, a revision number, or another suitable identifying segment is not the same) that indicates that the object in object store 8 has been modified since the last synchronization.

Synchronization manager 160 then determines whether any objects stored in object store 6 on mobile device 3A have been added or modified since the last synchronization. To determine whether an object has been added or deleted to object store 6, synchronization manager 160 compares the list of objects in reference store 162 (which reflects all objects at the last synchronization) with a list of objects on object store 6 maintained by synchronization manager 152.

To determine whether an existing object has been modified, synchronization manager 152 is configured to maintain in status bits associated with each object stored in object store 6. In particular, a status bit is maintained for each partnership that is formed between the mobile device 3A and partnered desktop computers. Referring back to FIG. 4, one status bit is associated with the partnership identified by identifier 91A and another status bit is associated with the partnership identified by identifier 91B. The status bits reflect whether the particular object associated with that bit has been changed since the last synchronization with each respective partnered desktop computer. If so, synchronization manager 152 notifies synchronization manager 160 of that change, if device 3A is then coupled to desktop computer 4, or simply logs the appropriate status bit and sends it to synchronization manager 160 the next time device 3A is coupled to desktop computer 4. In one embodiment, the operating system of the mobile device 3A sets the status bits when there has been a change to an object, while the synchronization manager 152 clears the appropriate status bit when the mobile device 3 has been synchronized with one of the partnered desktop computers.

It should be noted that none of these procedures require either synchronization manager 160 or synchronization manager 152 to be aware of the particular nature or format of the identifying data segments or of the objects to which they correspond. Rather, interface components 150 and 158 are called upon for all actions that depend upon the actual content of the identifying data segments, and the content of the objects. It is up to the designer of those interfaces to define a format for the identifying data segments that allows the interfaces to perform their required functions.

Once the changes, additions and deletions are determined by synchronization manager 160, the items are synchronized. In order to do this, synchronization manager 160 forms a list of objects which have been changed on either object store 8 or object store 6 and simply calls upon the respective synchronization interface components to update the outdated object. If the same object has been modified both on mobile device 3A and desktop computer 4, a conflict arises. Synchronization manager 160 resolves the conflicts by either prompting the user, or referencing profile information, discussed above.

Where an object has either been created at the desktop computer 4 or in the mobile device 3A, that object needs to be exchanged with the other device. In the instance where mobile device 3A needs to obtain a new object from desktop computer 4, synchronization manager 160 calls an interface method known as "Set-Up" which specifies a handle for the object to be obtained from object store 8 in desktop computer 4 and transferred to object store 6 in mobile device 3A. Once the handle is obtained, the method known as "Get-Packet" is called repeatedly to retrieve a data stream which represents the object, and which is formatted by interface component 158. Synchronization manager 160 simply treats the data as a data stream which is retrieved and sent over mechanism 9 to synchronization manger 162, and eventually to object store 6. The appropriate synchronization interface component 150 parses the data stream in order to identify certain property values associated with properties corresponding to the object. Those properties are then stored in the object store 6.

Finally, synchronization manager 160 updates the identifying data segments associated with either synchronized or exchanged objects and stores the updated data segments in reference store 162.

Due to the limited available memory typically found on the mobile device 3A, it is often desirable to set up a "filter" when synchronizing objects from object store 8 of the desktop computer 4 to object store 6 of the mobile device 3A. A filter is a set of rules that determine if a desktop computer object 5 should be synchronized with the mobile device 3A. If a desktop computer object is determined not to be synchronized (i.e. outside of the limits of the filter), its corresponding object on the mobile device 3A is removed. In other words, rather than maintaining all of the objects in object store 8 as corresponding objects in the object store 6, only a subset of the objects in object store 8 are maintained as objects in the object store 6. In this manner, only the most current information is stored on the mobile device 3A and made available to the user. The "rules" of the filter can take many forms, such as a particular type of data or file, directory or folder that will be synchronized. In another example, the rules can pertain to a period of time, for instance, where the mobile device 3A stores PIM information for future events and recent past events, such as meetings or appointments, and the desktop computer 4 stores all events, including archiving all past events. In the architecture of FIG. 6, the filtering function is performed by synchronization manager 160.

Problems, however, can arise when the mobile device 3A is partnered with and synchronizing data with two different desktop computers 4. These problems may be best illustrated by way of an example.

Assume today is October 8, and the following appointments (objects) are currently stored on the mobile device 3A:

(a) Meeting with John on Oct. 5;
(b) Lunch with David on Oct. 7;
(c) Meeting with Sue on Oct. 9; and
(d) Dinner with Anne on Oct. 12.

Assume also that the filtering function performed by synchronization manager 160 on the first partnered desktop computer is configured to synchronize only appointments in the last two days and the current day. Upon connection of the mobile device 3A to the first partnered desktop computer, only appointment (b) above is within the selected filter parameters. Thus, the following steps will be performed during synchronization:

(A1) Objects (a), (b), (c) and (d) will be created and stored in object store 8 of the desktop computer 4; and (A2) Objects (a), (c) and (d) will be deleted from object store 6 of the mobile device 3A due to being outside of the filter parameters; and (A3) The identifying data segment for object (b) will be stored in the reference store 162 for first desktop computer 4.

Accordingly, at the end of synchronization, only object (b) remains in the object store 6 of the mobile device 3A.

Now assume that a second partnered desktop computer has the same set of appointments in its object store 8 and the filtering function performed by synchronization manager 160 is to synchronize only appointments occurring the next day. When the mobile device 3A is connected to the second partnered desktop computer, synchronization manager 160 determines that only appointment (c) in the object store 8 is within the filtering parameters, and that appointment (b), currently on the mobile device 3A, is not within the filter parameters. Thus, the following steps are performed during synchronization:

(B1) Object (b) on the mobile device 3A is removed due to being outside of the filter parameters; and (B2) Object (c) on the second desktop computer is copied to the mobile device 3A; and (B3) The identifying data segment for object (c) will be stored in the reference store 162 for second desktop computer 4.

At the end of synchronization with the second desktop computer, only appointment (c) remains on the mobile device 3A.

Assume now that the mobile device is once again reconnected back to the first partnered desktop computer having the same filter parameters as set forth above. The following steps are then performed during synchronization:

(C1) Object (c) is removed from the mobile device 3A because it is outside the filter parameters; and (C2) Because object (b) was in the reference store 162 of the first desktop 4 but is no longer on the mobile device 3A, it is assumed to have been deleted by the user. This assumed action is then propagated to the first desktop computer and object (b) is deleted from the first desktop computer, erroneously. The first partnered desktop computer has interpreted that since an object is no longer on the mobile device 3A, which was there on the previous synchronization, the user has intentionally deleted it. Accordingly, the first partnered desktop computer will delete the corresponding object in its object store. However, from the example above, deletions could have been performed because the object did not fall within the filter parameters of the second partnered desktop computer. In this situation, data can be easily lost.

An aspect of the present invention addresses the problems associated with multiple partnered desktop computers operating different filtering functions. Generally, the method includes dynamically determining if the mobile device is configured or partnered with two or more desktop computers. If such is the case, programmatic deletion of objects on the mobile device that are outside the filter parameters (steps A2, B1, C1 above) will be suspended during synchronization. This will then prevent the other desktop partner from interpreting the filtered object as a user deletion. Objects deleted by a user will still be propagated to desktops regardless of whether they match the filter window.

Figure 7:
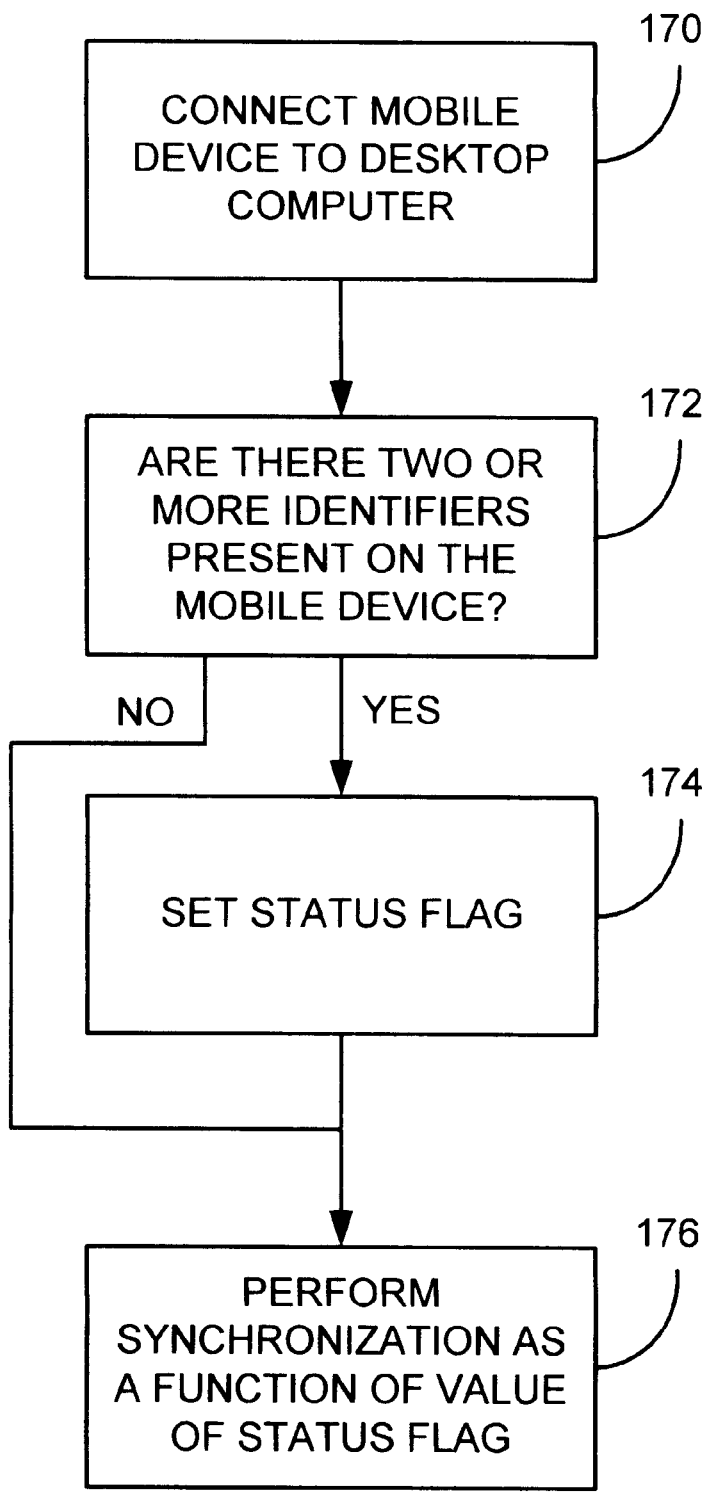
FIG. 7 is a state or flow diagram illustrating synchronization of information.

FIG. 7 is a flow chart illustrating an exemplary method in accordance with this aspect of the present invention. At step 170, the mobile device 3A is connected to the desktop computer 4. Synchronization manager 160 ascertains whether the mobile device 3A has one or two identifiers 91A and 91B. At step 172, if there are at least two identifiers 91A and 91B present on the mobile device 3A, a status flag is set at step 174. At step 176, synchronization is performed. However, if the status flag is set, objects will not be deleted from the object store 6 of the mobile device 3A. If, on the other hand, the status flag is clear or reset, a command will be sent to the mobile device 3A to remove the object from the object store 6. In this manner, objects will not be appearing and disappearing or inadvertently deleted from the other partnered computer.

Although the present invention has been described with reference to preferred embodiments, workers skilled in the art will recognize that changes may be made in form and detail without departing from the spirit and scope of the invention.

What is claimed is:

1. A method of interaction between a computer and a plurality of mobile devices, the method comprising:

storing a first identifier on a first mobile device and the computer;

storing a second identifier on a second mobile device the second identifier being different than the first identifier;

storing a first set of settings in the computer referenced to the first identifier for the first mobile device;

obtaining a set of default settings stored on the computer;

comparing the respective identifier stored on the mobile device with the first identifier stored on the computer upon connection of one of the mobile devices to the computer;

controlling interaction between the connected mobile device and the computer as a function of the stored respective set of settings if corresponding identifiers are found; and controlling interaction between the connected mobile device and the computer as a function of the default settings if corresponding identifiers are not found.

2. The method of claim 1 wherein the first mobile device and the second mobile device are not substantially similar.

3. The method of claim 1 wherein if corresponding identifiers are not found, a second set of settings and a second identifier referenced to the identifier on the connected mobile device is stored on the computer.

4. The method of claim 3 wherein a user may alter the second set of settings.

5. The method of claim 1 and further comprising storing a unique device name for each of the mobile devices in the computer referenced to each respective identifier.

6. The method of claim 5 and further comprising accessing each set of stored settings on the computer as a function of the device name of the mobile device.

7. The method of claim 5 and further comprising obtaining the device name from the mobile device when connected to the computer and checking the device name with the device name stored on the computer.

8. The method of claim 7 and further comprising changing the device name on the computer to match the device name of the mobile device if corresponding identifiers are found.

9. The method of claim 1 and further comprising storing a set of guest settings, and wherein the step of controlling interaction between the connected mobile device and the computer as a function of the stored set of guest settings if corresponding identifiers are not found.

10. The method of claim 9 wherein the step of storing a set of guest settings includes obtaining a set of default settings.

11. The method of claim 10 and further comprising detecting the type of mobile device when connected to the computer and changing at least one of the default settings as a function of the type of device detected.

12. The method of claim 1 and further comprising storing a name of the computer on each mobile device in association with each identifier.

13. The method of claim 1 and further comprising detecting the type of mobile device when connected to the computer and changing at least one of the default settings as a function of the type of device detected.

14. An interactive computer system comprising:
    a first mobile device having a first identifier stored thereon;
    a second mobile device having a second identifier stored thereon, the second identifier being different than the first identifier; and
    a computer selectively couplable to each of the mobile devices, the computer having a set of settings referenced by an identifier to at least one of the first identifier and the second identifier, the computer comparing the respective identifier stored on the mobile device with the identifier stored on the computer upon connection of one of the mobile devices to the computer, and controlling interaction between the connected mobile device and the computer as a function of the stored respective set of settings if corresponding identifiers are found, and controlling interaction between the connected mobile device and the computer as a function of a set of default settings if corresponding identifiers are not found.

15. The system of claim 14 and wherein the computer stores a device name for each of the mobile devices referenced to each respective identifier.

16. The system of claim 15 and wherein the computer includes a module for accessing each set of stored settings on the computer as a function of the device name of the mobile device.

17. The system of claim 14 where in the first mobile device and the second mobile device are not substantially similar.

18. A method of interaction between a computer and a plurality of mobile devices, the method comprising:
    creating a first set of settings controlling interaction of a first type of mobile device with the computer;
    creating a second set of settings controlling interaction of a second type of mobile device with the computer;
    storing the first and second set of setting on the computer;
    detecting the type of the mobile device when the mobile device is connected to the computer;
    accessing the first and second set of settings to control interaction of the computer with the mobile device as a function of the type detected; and
    assigning an identifier to identify a connected mobile device when connected to the computer;
    storing the identifier in the connected mobile device and the computer; and
    storing a third set of settings based on one of the first and second set of settings corresponding to the type of the connected mobile device, the third set of settings being referenced to the identifier.

19. The method of claim 18 wherein the step of storing the third set of settings includes storing a copy of one of the first and second set of settings.

20. The method of claim 19 and further comprising changing at least one setting of the third set of settings.

21. A method of interaction between a computer and a mobile device, the computer storing backup data for the mobile device referenced to a first identifier, the method comprising:
    connecting the mobile device to the computer;
    restoring the backup data to the mobile device from the computer;
    obtaining a second identifier different than the first identifier;
    storing the second identifier on the mobile device; and
    changing the first identifier on the computer to the second identifier.

22. The method of claim 21 wherein the mobile device includes a third identifier for interaction with a second computer, the method including invalidating the third identifier.

23. A method of interaction between a first computer and a mobile, device, and a second computer and the mobile device, the method comprising:
    ascertaining if the mobile device is configured to synchronize data with both the first and second computers;
    creating data on the first and second computers in accordance with data on the mobile device; and
    deleting data on the mobile device as a function of whether the mobile device is configured to synchronize data with both the first and second computers.

24. The method of claim 23 wherein the step of ascertaining includes setting a status flag if the mobile device is configured to synchronize with both the first and second computers, and wherein the step of deleting data includes deleting data on the mobile device as a function of the value of the status flag.

25. The method of claim 23 wherein the mobile device stores a first identifier if the mobile device is configured to synchronize data with the first computer, and the mobile device stores a second identifier if the mobile device is configured to synchronize data with the second computer, and wherein the step of ascertaining includes ascertaining the number of identifiers on the mobile device.

26. A method of interaction between a mobile device and a plurality of computers, the method comprising:
    storing a first identifier on the mobile device and a first computer;
    storing a second identifier on the mobile device and a second computer, the second identifier being different than the first identifier;
    storing a first set of settings in the first computer referenced to the first identifier;
    storing a second set of settings in the second computer referenced to the second identifier;
    comparing each identifier stored on one of the computers with each identifier stored on the mobile device upon connection of said one of the computers to the mobile device; and
    controlling interaction between the connected computer and the mobile device as a function of the stored respective set of set settings if corresponding identifiers are found.

27. The method of claim 26 and further comprising storing a computer name for each of the first and second computers referenced to each respective identifier.

28. The method of claim 26 wherein the steps of storing a first set of setting and storing a second set of settings each includes obtaining a set of default settings.

29. The method of claim 26 and further comprising detecting the type of mobile device when connected to said one computer, and changing at least one of the default settings as a function of the type of device detected.

30. An interactive computer system comprising:

a first computer having a first set of settings referenced to a first identifier;

a second computer having a second set of settings referenced to a second identifier, the second identifier being different than the first identifier;

a mobile device couplable to each of the computers, the mobile device having the first identifier and the second identifier stored thereon; and wherein upon connection of the mobile device with one of the computers, said one of the computers compares each identifier with the identifier stored thereon and controls interaction between the mobile device and said one of the computers as a function of the stored respective set of settings if corresponding identifiers are found.

31. A method of interaction between a computer and a plurality of mobile devices, the method comprising:

storing a first identifier on a first mobile device and a . computer;

storing a second identifier on a second mobile device and a computer, the second identifier being different than the first identifier;

storing a set of settings in the computer referenced to a stored identifier for at least of the first mobile device and the second mobile device;

storing a set of guest settings in the computer;

comparing the identifier on the mobile device with the identifier stored on the computer upon connection of one of the mobile devices to the computer;

controlling interaction between the connected mobile device and the computer as a function of the stored respective set of settings if corresponding identifiers are found; and controlling interaction between the connected mobile device and the computer as a function of the guest settings if corresponding identifiers are not found.

32. The method of claim 31 wherein the step of storing a set of guest settings includes obtaining a set of default settings.

33. The method of claim 32 and further comprising detecting the type of mobile device when connected to the computer, and changing at least one of the default settings as a function of the type of device detected.

* * * * *